US008599828B2

(12) United States Patent
Fine et al.

(10) Patent No.: US 8,599,828 B2
(45) Date of Patent: Dec. 3, 2013

(54) NON-COHERENT SECONDARY SYNCHRONIZATION SIGNAL DETECTING METHOD, DEVICE AND CORRESPONDING COMPUTER PROGRAM

(75) Inventors: Nadav Fine, Herzliyya (IL); Yossi Tsfati, Rishol-le-Zion (IL)

(73) Assignee: Sequans Communications, Puteaux (FR)

( * ) Notice: Subject to any disclaimer, the term of this patent is extended or adjusted under 35 U.S.C. 154(b) by 170 days.

(21) Appl. No.: 13/312,303

(22) Filed: Dec. 6, 2011

(65) Prior Publication Data
US 2012/0140862 A1     Jun. 7, 2012

(30) Foreign Application Priority Data
Dec. 6, 2010   (EP) .................................... 10193877

(51) Int. Cl.
*H04L 7/04* (2006.01)
(52) U.S. Cl.
USPC .......................................................... 370/350
(58) Field of Classification Search
USPC ........................................ 370/350, 310, 345
See application file for complete search history.

(56) References Cited

U.S. PATENT DOCUMENTS

| | | | |
|---|---|---|---|
| 2008/0205375 A1 | 8/2008 | Onggosanusi et al. | |
| 2008/0316947 A1 | 12/2008 | Lindoff et al. | |
| 2009/0011762 A1 | 1/2009 | Han et al. | |
| 2011/0009052 A1* | 1/2011 | Horiuchi et al. | 455/7 |
| 2012/0052869 A1* | 3/2012 | Lindoff et al. | 455/452.1 |
| 2013/0122822 A1* | 5/2013 | Srinivasan et al. | 455/67.13 |

FOREIGN PATENT DOCUMENTS

| | | |
|---|---|---|
| EP | 2187550 A1 | 5/2010 |
| WO | 2007042424 A1 | 4/2007 |

OTHER PUBLICATIONS

"Closed Concept for Synchronization and Cell Search in 3GPP LTE Systems", Wireless Communications and Networking Conference 2009.
G. Park et al., "Efficient Coherent Neighbour Cell Search for Synchronous 3GPP LTE System" Oct. 9, 2008.
S. Nagata et al., "Investigations of Synchronization Channel Sequences in OFDM Based Evolved Utra Downlink", NTT DoCoMo, 2007 IEEE.
Pei-Yun Tsai et al., "A new cell search scheme in 3GPP long term evolution downlink, OFDMA systems" International Conference on, IEEE, Piscataway, USA, Nov. 13, 2009.

(Continued)

*Primary Examiner* — Andrew Lai
*Assistant Examiner* — Zhiren Qin
(74) *Attorney, Agent, or Firm* — Westman, Champlin & Koehler, P.A.; David D. Brush

(57) ABSTRACT

A method and apparatus are provided for identifying a cell and a sub-frame by detecting a part of a secondary synchronization signal including a sequence of N OFDM symbols. For each OFDM symbol, the method obtains a set of metrics, each metric being associated with a predetermined combination of a cell identifier and a sub-frame alignment (CID/SF). For each metric, the method counts the number of times a metric exceeds a first predetermined threshold, delivering a summed value, and applies an M of N criterion to the summed value, delivering a ratio value. The ratios values are analyzed in order to identify the cell and the sub-frame, corresponding to a cell identifier and a sub-frame alignment, associated to a particular ratio value among the ratios values, which exceeds a second predetermined threshold.

8 Claims, 4 Drawing Sheets

(56) References Cited

OTHER PUBLICATIONS

Bartis M. et al., "Acheiving Secondary Synchronization for Downlink in the Long Term Evolution Standard" International Symposium on, IEEE, Piscataway, USA, Nov. 11, 2009.

Kim J. et al., "SSS Detection Method for Initial Cell Search in 3GPP LTE FDD/TDD Dual mode Receiver" ISCIT 2009.

European Search Report dated Jul. 27, 2011 for corresponding European Application No. 10193877.7, filed Dec. 6 2010.

* cited by examiner

NON-COHERENT SECONDARY SYNCHRONIZATION SIGNAL DETECTING METHOD, DEVICE AND CORRESPONDING COMPUTER PROGRAM

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to communication systems adapted to use Orthogonal Frequency Division Multiplexing (OFDM) modulation techniques and comprising multiple cells. More specifically, the present disclosure relates to the search of a cell in a communication system comprising a plurality of cells.

Evolving mobile cellular standards such as Global System for Mobile Communications (GSM) and Wide-band Code Division Multiple Access (WCDMA) have required modulation techniques such as Orthogonal Frequency Division Multiplexing (OFDM) in order to deliver higher data rates. OFDM is a frequency-division multiplexing (FDM) scheme utilized as a digital multi-carrier modulation method. More precisely, OFDM is a method for multiplexing signals, which divides the available bandwidth into a series of orthogonal frequencies known as orthogonal sub-carriers, meaning that cross-talk between the sub-channels is eliminated and inter-carrier guard bands are not required.

In order to ensure a smooth migration from existing cellular systems to high capacity, high data rate systems using existing radio spectrum, new systems must be able to operate on a flexible bandwidth (BW). Third generation Long Term Evolution (3G LTE) has been proposed as a new flexible cellular system. 3G LTE is intended as an evolution of the 3G WCDMA standard. 3G LTE uses OFDM and operates on BWs spanning from 1.25 MHz to 20 MHz. Data rates of up to 100 Mb/s will be possible in the high BW 3G LTE service.

3G LTE system achieves higher frequency efficiency and user throughput, and provide full IP-based functionalities with low latency and low cost. In the downlink, OFDM based radio access was adopted because of its inherent robustness against multipath interference and its affinity to different transmission bandwidth arrangements.

At the beginning of communication, i.e., physical channel setup, the user equipment (UE) must perform a cell search. A cell search is also required in other situation along a communication, for example in mobility situations. Indeed, an important aspect of 3G LTE is its mobility, hence synchronization OFDM symbols and cell search procedures are also important due to the need for the user equipment (UE) to detect and synchronize with cells.

BACKGROUND OF THE DISCLOSURE

In the cell search, the user equipment UE acquires a cell ID in addition to a received sub-frame and radio frame timings in the downlink. The cell search process must also be performed periodically in order to update the cell to be connected and to find a candidate cell for handover. The cell ID corresponds to a cell-specific scrambling code, which is necessary to randomize other-cell interference in cellular system with multi-cell configuration. The cell ID composition and the general cell search procedure are described herein after.

According to 3G LTE specifications, downlink transmission is organized into radio frames with a duration of 10 ms. Each radio frame consists of 10 sub-frames, each with two consecutive 0.5 ms slots. Data are mapped on a time-frequency resource grid consisting of elementary units called resource elements (RE). They are uniquely identified by the transmit antenna, the sub-carrier position and the OFDM symbol index within a radio frame.

A dedicated synchronization channel (SCH) is specified in 3G LTE for transmitting two synchronization signals, the primary (PSS) and the secondary (SSS). Within the synchronization channel, both synchronization sequences are mapped on 62 subcarriers located symmetrically around the DC-carrier. They are transmitted within the last two OFDM symbols of the first and sixth sub-frame (sub-frame index 0 and 5), i.e. every 5 ms.

The PSS signal consists of three length-62 Zadoff-Chu sequences in frequency domain which are orthogonal to each other. Each sequence typically corresponds to a sector identity Ns=0, 1 or 2 within a group of three sectors (physical cell). The value of Ns is also referred to as $CID_2$ (Cell ID 2) in the LTE specification.

The SSS signal consists of a frequency-domain sequence of OFDM symbols d(n) with the same length as the PSS, which is an interleaved concatenation of the two length-31 scrambled binary sequences $s_0(n)$ and $s_1(n)$. In order to distinguish between different sector groups (physical cells), $s_0(n)$ and $s_1(n)$ depend on a pair of integers $m_0$ and $m_1$, which are unique for each group-ID Ng (from 0 to 167). The value of Ng is also referred to as $CID_1$ (Cell ID 1) in the LTE specification.

The concatenated sequences are scrambled again with one of the sequences $c_0(n)$ and $c_1(n)$, which are cyclic shifted versions of the length-31 binary sequence $\tilde{c}(n)$.

The binary sequence $\tilde{c}(n)$ is a scrambling sequence, which depends on the PSS information ($CID_2$). The fact that it is used for descrambling doesn't make the detection "coherent" because descrambling is perhaps needed for detection but is not detection.

Indeed, the detection takes some information from the PSS detection (the PSS timing, the $CID_2$) but the SSS detection doesn't use a channel estimate from an external source and is as a consequence "non-coherent".

The shift value is depending on the sector-ID Ns, while a constant shift of 3 samples holds between $c_0(n)$ and $c_1(n)$.

Further, a pair of scrambling sequences $z_1^{m0}(n)$ and $z_1^{m1}(n)$ (cyclic shifted versions of sequence $\tilde{z}(n)$), which are multiplied with the odd entries of the SSS.

$\tilde{Z}(n)$ is a known, fixed scrambling sequence corresponding to a fixed sequence of 31 0's and 1's defined in the LTE standard, which does not depend on Ng or Nc. In order to form $z_1^{m0}(n)/z_1^{m1}(n)$, this scrambling sequence is cyclically shifted by (m0/m1) modulo 8, so there are 8 possible shifts for the original scrambling sequence.

In order to enable the detection of beginning of radio frame, the SSS signal is different for each sub-frame index (0 or 5), thus the final SSS sequence d(n) is described in the standard of LTE 36211 and is given by:

$d(2n)=S_0^{m0}(n)c_0(n)$ in sub-frame 0, $d(2n)=S_1^{m1}(n)c_0(n)$ in sub-frame 5.

and $d(2n+1)=S_1^{m1}(n)c_1(n)z_1^{m0}(n)$ in sub-frame 0, $d(2n+1)=S_0^{m0}(n)c_1(n)z_1^{m1}(n)$ in sub-frame 5.

The set of $(m_0, m_1)$ pairs have 1-1 correspondence with the encoded Ns so that decoding this pair permits decoding Ns.

As d(n) is mapped to real valued BPSK constellation, time domain symmetry always holds for the SSS signal. The overall cell-ID Nc (from 0 to 503) is equal to Nc=3Ng+Ns is thus defined by the sector and group identities Ns and Ng. The value of Nc is also referred to as CID (cell ID) in the LTE specification. As a consequence, the CID depends on $CID_1$ and $CID_2$. When the $CID_2$ is known (given by the PSS information), the CID detection corresponds to the cell group ID ($CID_1$) detection.

In 3G LTE system, initial cell search procedure comprises two steps using PSS and SSS as shown in FIG. 1. First, OFDM symbol timing and physical-layer ID are detected by PSS in time domain. Second, radio frame timing and cell group ID are detected by SSS in frequency domain. In general, coherent detection using estimated channel frequency response (CFR) at PSS is used for SSS detection. Nevertheless, it is possible to use both coherent and non-coherent detection for detecting the SSS and thus identifying the cell ID to which the user equipment is connected.

Some problem remains when searching for cell ID.

For example, when performing cell-search in 3G LTE with the SSS (Secondary Synchronization Signal), and when there exists very strong interference on the desired cell from a neighbor cell having the same Ng (modulated on the PSS) and the same frame timing (e.g. in TD-LTE), the detection performance of typical coherent detector suffers from dramatic degradation.

For instance, the performance of the Zero-Force (hereafter ZF) Correlation, Complex-Conjugate Correlation and Maximum-Likelihood (hereafter ML) is severely degraded.

The detection performance becomes unacceptable because the CFR (channel frequency response) needed for coherent detection is estimated by de-correlating the input samples FFT with the PSS information sequence, and a distortion of the CFR is obtained when estimating it from the interfered PSS signal.

The issue with interference is as follows: two cells transmit the exact same PSS signal. And this signal is received in the user equipment (UE) in the exact same time if the distance between the two cells and the user equipment is the same. In this case, the user equipment can not separate the PSS part coming from each of the two cells, so as to estimate the channel from each cell separately. As a consequence, the channel estimate from the PSS can not be used in the general case.

The problem becomes critical when doing initial cell-search and there is no information about the cell ID of the interfering cell, so that subtraction of interference is not possible.

Integration over multiple SSS OFDM symbols improves SNR performance but has no impact on detection when averaging the neighbor cell distortion effect in static channel conditions.

Thus, there exists a need for a method for performing cell search when strong interferences are present in the signal received by the user equipment. More particularly, there exists a need for a method allowing a cell search in case of a low power ratio between the desired carrier power and total interference power from cells transmitting the exact same PSS signal.

However, coherent correlation methods are desirable in case of channel dispersion or inaccurate timing estimate of the SSS position. This is because the channel estimation and de-correlation negates the effect of channel dispersion or timing inaccuracy. Such dispersion causes performance degradation in simple non-coherent integration methods that correlate the input signal directly with the SSS OFDM symbol hypotheses.

Current methods are based on:

a) Coherent integration (where the channel is estimated from the PSS), which suffers from severe degradation in case of strong interference, b) Non-coherent integration without any search of the received channel, which suffers from non-immunity to channel response variation across frequency, c) Coherent correlation when the interference is subtracted from the estimated channel in the SSS correlation. This method is good when the interface cell ID is known but not in an initial cell-search situation.

SUMMARY

An embodiment of the invention relates to a method for identifying a cell and a sub-frame by detecting a part of a secondary synchronization signal of a dedicated synchronization channel (SCH), said part of secondary synchronization signal consisting of a time-domain sequence of OFDM symbols comprising even and odd OFDM symbols, each OFDM symbol corresponding to a frequency-domain sequence of even and odd resource element (RE), each resource element corresponding to one complex-valued modulation of said even and odd OFDM symbol, According to an embodiment of the invention, for each OFDM symbol among said sequence of OFDM symbols, said method comprises:

a step of obtaining a set of metrics for said current OFDM symbol, each metric of said set of metrics being associated with a predetermined combination consisting of a cell identifier and a sub-frame alignment (CID/SF), and characterized in that said method further comprises for each metric of said set of metrics being associated with a predetermined combination consisting of a cell identifier and a sub-frame alignment (CID/SF):

a step of counting the number of times a metric associated with a predetermined combination consisting of a cell identifier and a sub-frame alignment (CID/SF) exceeds a first predetermined threshold, delivering a summed value, a step of applying an M of N criterion to said summed value, delivering a ratio value;

and characterized in that said method further comprises:

a step of analyzing said ratios values, in order to identify a cell and a sub-frame, corresponding to a cell identifier and a sub-frame alignment, associated to a particular ratio value among said ratios values, which exceeds a second predetermined threshold.

Thus, an embodiment of the invention provides a reliable detection of a part of a secondary synchronization signal of a dedicated synchronization channel (SCH), specified in 3G LTE. Indeed, according to this general first embodiment, all the possible combination consisting of a cell identifier and a sub-frame alignment (CID/SF) are scanned and the detection of the transmitted combination is asserted by checking that the detection of a combination occurs several times.

As already mentioned, when the $CID_2$ is known (given by the PSS information), the CID detection corresponds to the cell group ID ($CID_1$) detection. For example, if the metric associated with $CID_1$/SF=8/0 crosses said first predetermined threshold 4 times in 6 SSS OFDM symbols, the combination of $CID_1$=8 and SF=0 is detected.

According to a preferred embodiment, said metric corresponds to a Carrier-to-Interference Ratio (CINR) based on the ratio of said secondary synchronization signal power to interference and noise power.

Such a metric provides a reliable association with one combination consisting of a cell identifier and a sub-frame alignment. Indeed the desired part of the SSS signal is the part of the SSS signal that is modulated with one $CID_1$/SF combination value. As a consequence, the desired part of the SSS signal differs for each $CID_1$/SF combination value. In particular, whenever an SSS modulating a certain $CID_1$/SF combination does not exist in the input samples, the expected CINR result is $-\infty$dB.

With this metric, said first predetermined threshold is for example set to $-3$ dB for a certain $CID_1$/SF value in order to declare this value as detected.

According to a preferred embodiment, said step of determining a metric of said part of a secondary synchronization signal involves a fast sequence transform based on Hadamard transform.

According to a second specific embodiment, every OFDM symbol of said sequence of OFDM symbols is associated to a frequency-domain sequence of 31 even and 31 odd resource elements (RE), each resource element corresponding to one complex-valued modulation of said OFDM symbol and said metric is a result of a calculation among at least one subset of said resource elements. And, according to this specific embodiment, said step of obtaining said set of metrics comprises, for a current metric corresponding to a current OFDM symbol and a predetermined combination consisting of a cell identifier and a sub-frame alignment ($CID_1$/SF):

a step of obtaining a first value depending on said 31 even resource elements, a step of obtaining a second value depending on said 31 odd resource elements, a step of obtaining said current metric in view of said first and second values.

Thus a separate treatment on even and odd resource elements allows reducing the complexity involved when obtaining said metric. This embodiment is described in details in the following.

According to a specific variant of said second embodiment, said first value, for every cyclic shift m applied to even resource elements, is the $m^{th}$ of the cyclic-correlation and sum operation performed using said Hadamard transform of a basic m-sequence. And, according to this specific variant of the previous embodiment said step of obtaining a second value involves 8 scrambling sequences based on said Hadamard transform, applied on said 31 odd resource elements. As already mentioned above, there are indeed 8 possible shifts for the scrambling sequence, typically operated in the absence of knowledge of the shift at the time of measuring CINR. The way to overcome this is to perform the measurement 8 times. Indeed, when the CINR is collected for the different $CID_1$/SF combination values, this value implies a cyclic shift of the z-sequence so it permits selecting the CINR measurement associated with the proper descrambling sequence.

Thus, a reduction of the complexity is obtained by taking benefit of only a single contribution of the even resource elements and only 8 contributions of the odd resource elements.

According to a third specific embodiment, every OFDM symbol of said sequence of OFDM symbols is associated to a frequency-domain sequence of 31 even and 31 odd resource elements (RE), each resource element corresponding to one complex-valued modulation of said OFDM symbol and wherein said metric is a result of a calculation among at least one subset of said resource elements. And, according to this specific embodiment, said step of obtaining said set of metrics comprises, for a current metric corresponding to a current OFDM symbol and a predetermined combination consisting of a cell identifier and a sub-frame alignment (CID/SF):

a step for obtaining a first value depending on said 31 even resource elements, a step of obtaining said current metric in view of said first value.

Thus, this third embodiment permits to apply a different complexity reduction option in order to increase the complexity reduction involved when obtaining said metric. Indeed, a reduction of the complexity is obtained by taking benefit of only a single contribution of the even resource elements. This embodiment is described in details in the following.

According to another aspect, an embodiment of the invention also relates to a device for identifying a cell and a sub-frame by detecting a part of a secondary synchronization signal of a dedicated synchronization channel (SCH), said part of secondary synchronization signal consisting of a time-domain sequence of OFDM symbols comprising even and odd OFDM symbols, each OFDM symbol corresponding to a frequency-domain sequence of even and odd resource element (RE), each resource element corresponding to one complex-valued modulation of said even and odd OFDM symbol, According to an embodiment of the invention, for each OFDM symbol among said sequence of OFDM symbols, said device comprises:

means for obtaining a set of metrics for said current OFDM symbol, each metric of said set of metrics being associated with a predetermined combination consisting of a cell identifier and a sub-frame alignment (CID/SF), and characterized in that said device further comprises for each metric of said set of metrics being associated with a predetermined combination consisting of a cell identifier and a sub-frame alignment (CID/SF):

means for counting the number of times a metric associated with a predetermined combination consisting of a cell identifier and a sub-frame alignment (CID/SF) exceeds a first predetermined threshold, delivering a summed value, means for applying an M of N criterion to said summed value, delivering a ratio value;

and characterized in that said device further comprises:

means for analyzing said ratios values, in order to identify a cell and a sub-frame, corresponding to a cell identifier and a sub-frame alignment, associated to a particular ratio value among said ratios values, which exceeds a second predetermined threshold.

In another aspect, an embodiment of the invention also relates to a computer program product downloadable from a communications network and/or stored on a computer readable medium and/or executed by a microprocessor, characterized in that it includes instructions of program code for implementing the method for identifying a cell and a subframe by detecting a part of a secondary synchronization signal of a dedicated synchronization channel (SCH), as previously described, when run on a computer.

BRIEF DESCRIPTION OF THE DRAWINGS

The proposed device and method are described in the following by way of examples in connection with the accompanying figures without limiting the scope of the protection as defined by the claim. The figures show:

DETAILED DESCRIPTION OF ILLUSTRATIVE EMBODIMENTS

1. General Principles of an Embodiment of the Invention

The proposed technique relates to the search of a cell in LTE like communication network by using the SSS (Secondary Synchronization Signal). The secondary synchronization signal is linked to the cell identity group $CID_1$ and the cell identity CID within the group.

Figure 3:
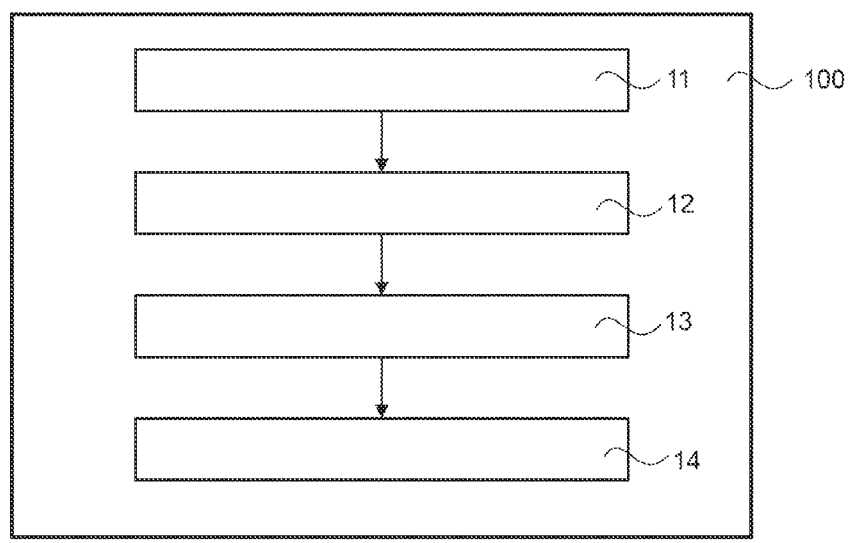
FIG. 3 illustrates the main steps of the method according to a first basic embodiment.

As already mentioned the inventors propose a new method for realizing a cell search. More particularly, the inventors propose a new approach, of the detection of the SSS sequence illustrated by FIG. 3 of the basic first embodiment. This approach is firstly based on a step of obtaining 11 a set of metrics, each metric of said set of metrics being associated with a predetermined combination consisting of a cell identifier and a sub-frame alignment (CID/SF). For instance, a metric corresponding to the Carrier-to-Interference-and-Noise Ratio (CINR), which is the ratio between the desired signal power and the power of all interference components and thermal noise, is used in a preferred embodiment.

This new approach is a non-coherent approach. This means that this approach does not use the results of the detection of the PSS, which has been previously realized for obtaining the channel frequency response (CFR).

The channel estimation from the PSS is used only to provide the SSS timing (to locate the samples needed for SSS detection) as well as to provide the sector identity of the cell identifier (named CID2) being classically needed for descrambling some of the SSS information. Indeed, when, thanks to an embodiment of the present invention, the good combination consisting of the cell group identifier $CID_1$ of the cell (which transmits the SSS signal) and a sub-frame is obtained, and using the CID2 previously obtained from the PSS, the SSS scrambling sequences is fixed and the overall cell-ID Nc (CID) is obtained.

In others words, the technique uses a non-coherent an estimation of a metric, for instance the Carrier-to-Interference-and-Noise Ratio (CINR), in at least three embodiments, which appear to be alternative embodiments for the same object. Generally speaking, the SSS detection method of an embodiment of the invention (and corresponding device) tries to identify two parameters—a cell identifier CID and Sub-Frame (SF) alignment—out of the 168*2 combinations this is the number of combinations for $CID_1$ (168 options)/SF (2 options) and not for CID/SF. Indeed, as already mentioned, when the $CID_2$ is known (given by the PSS information), the CID detection corresponds to the cell group ID ($CID_1$) detection.

It does so by associating a metric, for instance the Carrier-to-Interference-and-Noise Ratio (CINR), to all parameter combinations (respectively a combination consisting of a cell identifier and a sub-frame) or to related parameters.

The method of an embodiment of the invention is based on the fact that for wrong parameter hypotheses a 'carrier' will not exist and thus the correlation result would look like noise, so an estimate of the metric, for instance the CINR, would be close to zero.

In the following, all the details about the specification are based on the use of a metric is the Carrier-to-Interference-and-Noise Ratio (CINR).

For a proper hypothesis the method gets the actual CINR out of a correlator, which is beneficial for assessing the reliability of the detection and leads to the identification of a correct hypothesis, which thus leads to the identification of the two parameters—CID and Sub-Frame (SF) alignment.

In various exemplary embodiments of the invention, the difference between exemplary embodiments is how the scanning of the set of 168*2 combinations is realized for obtaining the set of metrics a given OFDM of the SSS.

- in a first embodiment, one directly scans all 168*2 combinations, which means that one associates a CINR value with each combination.
- in a second embodiment one scans the even and odd sub-carriers separately from which the CINR of the parameter combinations is deduced. This embodiment leading to the same CINR of the first embodiment, is superior to the first embodiment in complexity.
- in a third embodiment, one scans even Resources Elements (RE) only in multiple locations, using the fact that these RE carry $m_0$ and $m_1$ in intermittent appearances.

A part of secondary synchronization signal consists of a time-domain sequence of OFDM symbols comprising even and odd OFDM symbols, each OFDM symbol corresponding to a frequency-domain sequence of even and odd resource element (RE). Each RE corresponding to one complex-valued modulation of said even and odd OFDM symbol.

Basically, in the method of an embodiment of the invention for realizing the non coherent identification of the two parameters-CID (when the $CID_2$ is known (given by the PSS information), the CID detection corresponds to the cell group ID ($CID_1$) detection) and Sub-Frame (SF) alignment, there are 168*2 combinations for the value of the S scrambled binary sequences when looking on the 62 even and odd RE together, and all must be scanned according to the first embodiment of the invention.

According to the second embodiment, for the 31 even RE alone there are 31 combinations, which are realized by 31 cyclic shifts on an m-sequence (see the document "*on Fast m-Sequence Transform*" by Lempel and Cohn, IEEE Transactions on Information Theory, January 1977, Volume: 23 Issue: 1, page(s): 135-137). For the 31 odd RE alone there are slightly less than 31*8 combinations, which are realized by 8 scrambling combinations in addition to the cyclic shifting of the same m-sequence.

In fact, that is why there is a computational benefit in separation in three embodiments, because if one counts the number of processed RE, ones get the following:

62(RE)*168*2(combinations)=20832 calculations, embodiment 1:

31 (even RE)*31 (combinations)+31 (odd RE)*31*8 (combinations)=8649 calculations, embodiment 2:

31(even RE)*31(combinations)=961 calculation. embodiment 3:

Herein after are detailed explained these three embodiments of the method and device.

For all methods, identifying the underlying parameters of a combination CID/SF is performed for each OFDM symbol among the time-domain sequence of said part of secondary synchronization signal, by obtaining 11 a set of metrics, for instance the Carrier-to-Interference-and-Noise Ratio, each metric of said set of metrics being associated with a predetermined combination consisting of a cell identifier and a sub-frame alignment (CID/SF). Detection of multiple concurrent cells is possible with all the embodiments below.

In addition, for each metric of said set of metrics being associated with a predetermined combination consisting of a cell identifier and a sub-frame alignment (CID/SF), all methods comprise also:
- a step of counting 12 the number of times a metric associated with a predetermined combination consisting of a cell identifier and a sub-frame alignment (CID/SF) exceeds a first predetermined threshold, delivering a summed value,
- a step of applying 13 an M of N criterion to said summed value, delivering a ratio value;

and characterized in that said method further comprises:
a step of analyzing 14 said ratios values, in order to identify a cell and a sub-frame, corresponding to a cell identifier and a subframe alignment, associated to a particular ratio value among said ratios values, which exceeds a second predetermined threshold.

The step of applying 13 an M of N criterion to said summed value, delivering a ratio value could be in a variant, replaced by a step of averaging the metric over the N tests to increase its accuracy and then analyze then that the average obtained value exceeds a third predetermined threshold.

Other classical algorithm options could also be used for this step.

Prior to the detailed description of each embodiment, the following paragraph aims at describing how the CINR is classically extracted.

2. Description of a First Embodiment

Figure 1:
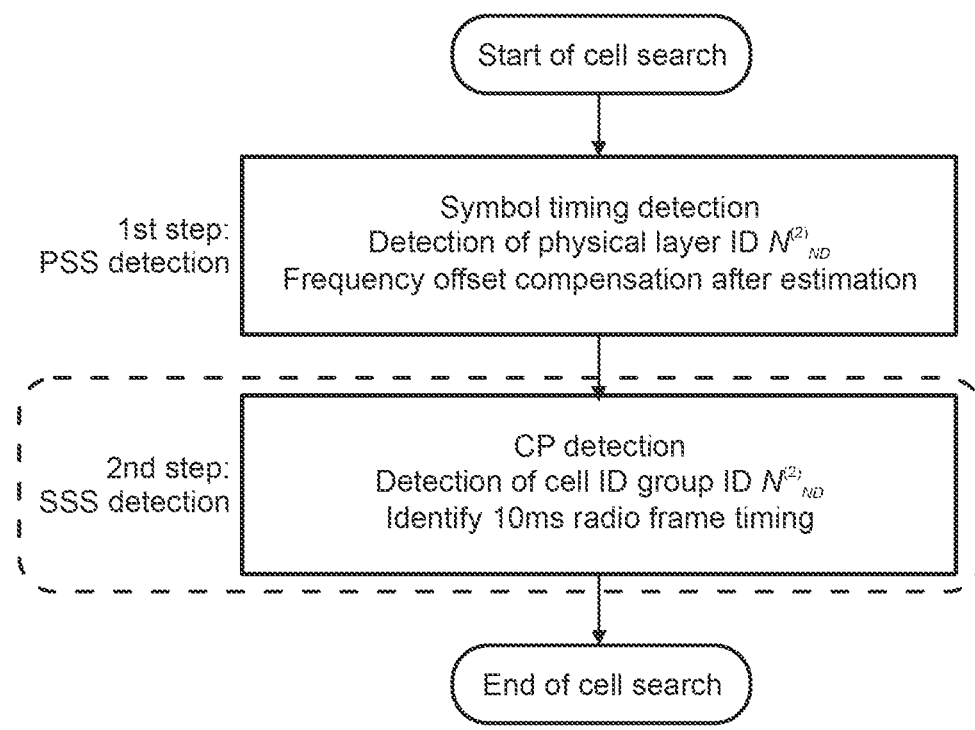
FIG. 1 is an illustration of the general cell search procedure.
Figure 2A:
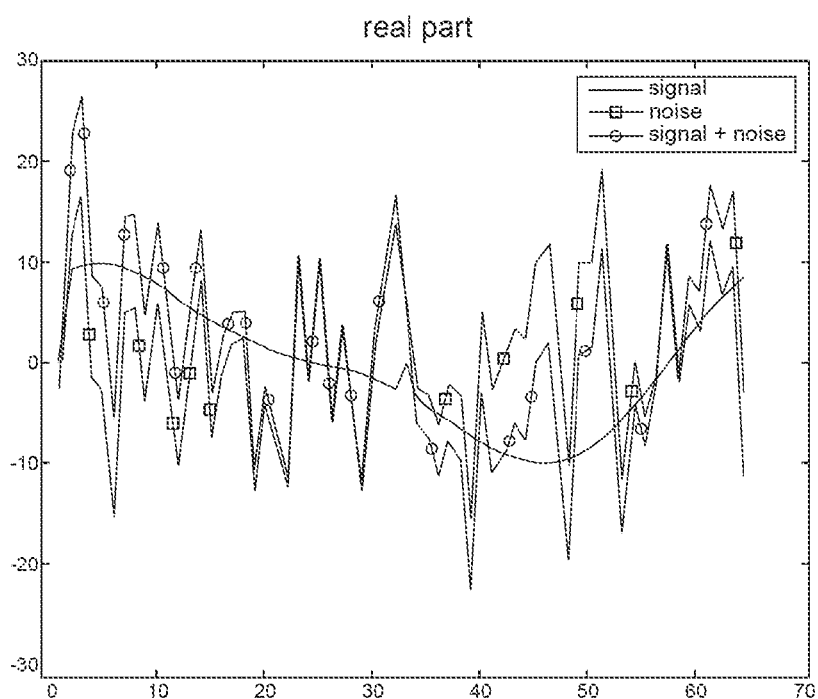
FIGS. 2A and 2B give an illustrative example of a sequence of symbol from which a metric corresponding to a CINR is extracted.

To understand how the CINR is extracted, FIG. 2A gives an illustrative example of a sequence of 1's outputted by a Fast Fourier Transform (FFT) with 64 points.

The x-axis corresponds to FFT output frequency bin. Of course, only the curve with circles (corresponding to signal+noise) is given in the FFT output. The resource element (RE) with indexes 0 and 32 carry no data so they're nullified at the FFT output.

The curve with squares is the desired signal—it's a sequence of 1's (after descrambling) multiplied by the smooth Fourier transform of the channel. The channel appears smooth because in this example its duration is much smaller than the symbol duration. In the curve with circles, a trend resembles the channel and submerged in noise, is observed.

To separate out the signal from noise and interference, channel estimation is necessary. The best way to perform channel estimation with no prior knowledge of the channel distribution is to use IFFT.

Figure 2B:
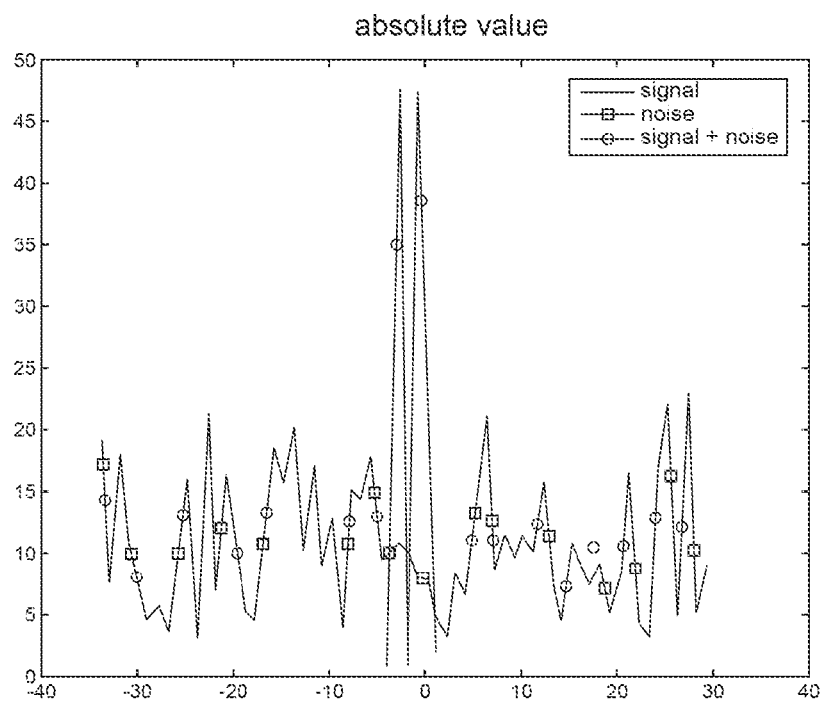

The x-axis of FIG. 2B corresponds to time shift (in samples) after IFFT. The channel taps are evident with delay that is around 0, where 0 is the SSS first extracted sample time.

The following has been obtained:
The output bins that are distant from 0 contain noise and interference only,
The bins that are near 0 contain a mixture of desired signal and noise.

Two estimators are then classically applied. First, an average sample power (measured at the output of the FFT, for example) provides an estimate to the total power of signal and noise/interference per sample, noted [S+I].

Classically, some assumptions are made on the range of channel taps. For this example, it is supposed that the channel taps are never be outside the delay range of [−2, 2]—this roughly corresponds to assuming that the sum of timing inaccuracy (from the PSS) and channel delay spread would never exceed 2 samples. This range is in fact compensating for not working with channel estimation by bounding the channel useful delay range. So by "summing" the IFFT output across these bins, an estimate for the entire signal power (for all the samples) is obtained, and a portion of the noise. The portion is relative to the range size, for the given example of FIGS. 2A and 2B, this portion is 5. The entire signal power and the portion of noise are then noted [64S+5I].

Now obviously the following set of linear equations can be solved to obtain and estimate for the signal power [S], and the interference power [I]:

$$[64S+5I]=64*[S]+5*[I],$$

$$[S+I]=[S]+[I],$$

An estimate of the CINR can be obtained by dividing the two estimates [S] and [I]:

$$[CINR]=[S]/[I]$$

Other metrics may be also used as for instance:
Biased signal power (the entire signal added to a portion of the noise [64S+5I])—in this case, the threshold depends on the thermal noise power,
Normalized biased signal power [64S+5I]/[I], corresponding to the ratio of the biased signal power divided by the noise of a sample (a time shift of an Inverse Fast Fourier Transform (IFFT) applied to the signal),
Normalized correlation power [64S+5I]/[S+I],
Or any function that increase with S (for fixed I) and non-increase with I (for fixed S) can be used.

3. Description of a Second Embodiment

The first embodiment, requires evaluation of 2*168 metric values per SSS OFDM symbol corresponding to a frequency-domain sequence of 62 even and odd resource element (RE), said metric being preferentially CINR.

One of the drawbacks of the basic first embodiment previously described comes from the complexity involved by the IFFT-based approach. The number of combinations for CID/SF is 168*2, so to carry out the IFFT-based procedure, it is necessary to carry out 168*2 times descrambling and IFFT.

The calculation of [S+I] part is prior to descrambling, so it can be calculated once and then be used for all 168*2 possibilities.

But on the contrary the calculation of the [64S+5I] of the example above, has to be executed for all 168*2 possibilities.

The second embodiment aims at reducing the complexity of the calculations.

The idea for complexity reduction draws from the fact that the IFFT output bin 0 of FIG. 2B is in fact the direct result of taking the inner product of the FFT output sequence and the descrambling sequence. This inner product can be calculated efficiently and preferentially for multiple cell identifier (CID) concurrently using the Hadamard transform, and in particular a Hadamard32 transform.

For output bins other than 0 the signal can be cyclically delayed by the required amount (between −2 . . . 2 in the example above) using a rotator applied to the FFT output, and then the same inner product operation can be performed. With the delay of −d, the IFFT output bin 0 will in fact be equal to IFFT output bin d without a delay.

The formula for IFFT output bin 0 for the SSS signal is the following:

$$\sum_{n=0}^{63} e_k^* F_k$$

Where $F_k$ is the FFT output for bin k and $e_k$ is the zero-padded SSS data sequence given by:

$e_k = d_{k+30}$ for k=1 . . . 31 (carriers above DC)

$e_k = d_{k-33}$ for k=33 . . . 64 (carriers below DC)

$e_k = 0$ for k=0 (DC subcarrier, where data is not transmitted, so the FFT output is nullified)

$e_k = 0$ for k=32 (subcarrier opposite to DC, where data is not transmitted, so the FFT output is nullified)

As already mentioned, the data sequence d depends on the CID1/SF and is given by the following formula:

$$d(2n) = \begin{cases} s_0^{(m_0)}(n)c_0(n) & \text{in subframe 0} \\ s_1^{(m_1)}(n)c_0(n) & \text{in subframe 5} \end{cases}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

The resulting formula for IFFT output bin 0 for the SSS signal is the following:

$$\sum_{n=0}^{30} \left(s_{0/1}^{(m_0/m_1)}(n)c_0(n)\right)^* F_{k(n)}$$

where the k-indexes corresponding to the even series—d(2n) in the formula—by k(n) (the two possibilities separated by slash (/) depend on whether SF=0 or SF=5).

The series $s_0$ and $s_1$ are in fact cyclic shifts of the same basic m-sequence, for which the inner product with for all cyclic shifts can be calculated efficiently using Hadamard32 transform and input/output permutation (see "*on Fast m-Sequence Transform*" by Lempel and Cohn, IEEE Transactions on Information Theory, January 1977, Volume: 23 Issue: 1, page(s): 135-137).

The values of $c_0(n)$ depend only on the cell identifier of the sector identity ($CID_2$) obtained from the PSS signal and therefore descrambling with this sequence can be performed once for all possible CID/SF data combinations.

Figure 4:
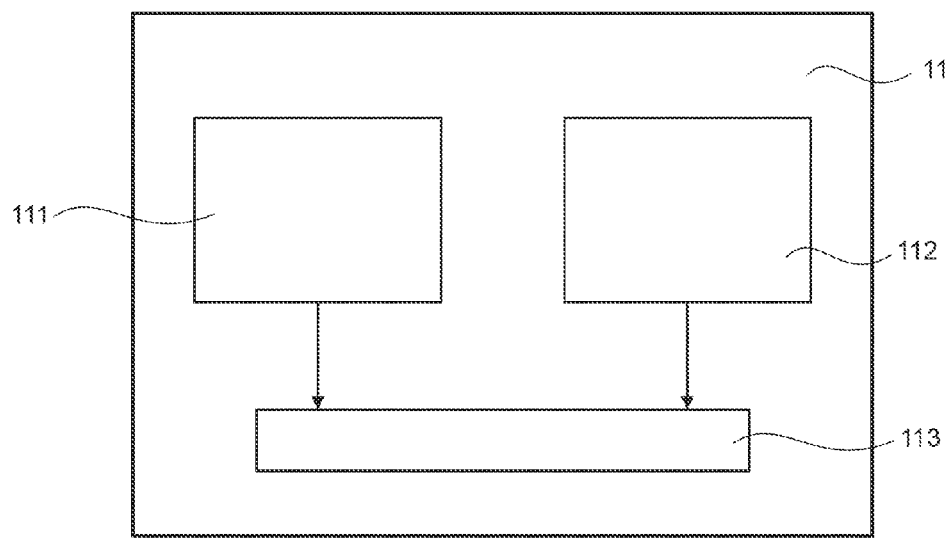
FIG. 4 illustrates the main steps of the method according to a second embodiment.

As a result the second embodiment illustrated by FIG. 4, proposes a reduction of the complexity of the step of obtaining 11 said set of metrics comprises:

a step of obtaining 111 a first value depending on said 31 even resource elements, a step of obtaining 112 a second value depending on said 31 odd resource elements, a step of obtaining 113 said current metric in view of said first and second values.

The step of obtaining 111 a first value depending on said 31 even resource elements is based on the fact that for every cyclic shift value m, the desired inner product result, which is the contribution of the 'd(2n)' even resource elements to the total sum $$\sum_{n=0}^{63} e_k F_k,$$

is simply the $m^{th}$ element of $$H\{c_0(n)^* F_{k(n)}\}_{l=0}^{30} = \sum_{n=0}^{30} m((n-l)_{mod31})^* c_0(n)^* F_{k(n)}$$

Where H{ } corresponds to the cyclic-correlation and sum operation that is performed using Hadamard transform and provides the correlation with all possible cyclic shifts of the basic m-sequence m. The expression "mod31" is used to indicate that the correlation is with a <<cyclically>> shifted version of m. The cyclic shift amount is indexed by l in the expression above.

Concerning the step of obtaining 112 a second value depending on said 31 odd resource elements—d(2n+1) in the formula above, where the k-indexes for these elements in $$\sum_{n=0}^{63} e_k F_k$$

are denoted by k'(n), the following operation need to be performed:

$$\sum_{n=0}^{30} \left(s_{0/1}^{(m_1/m_0)}(n)c_1(n)z_1^{(m_0/m_1)}\right)^* F_{k'(n)}$$

Again $c_1(n)$ (a fixed scrambling sequence defined in the LTE standard) depends solely on the cell identifier of the cell which transmits the PSS signal CID2 value so it can be descrambled similarly for all CID/SF values.

The scrambling series $z_1$ depends on the cyclic shift value of $m_{0/1}$, which is not known a-priori. Indeed, but in fact there are only 8 possible $z_1$ series so all the options for $z_1$ can be traversed. In addition, for odd resource elements, the s-series are again cyclic shifts of a basic m-sequence, for which the inner product can be performed efficiently using Hadamard32 transform.

As a consequence, the following operations are conducted using 8 Hadamard32 transforms:

$$H\{c_1(n)F_{k'(n)}z_1^{(0)}\}$$

$$H\{c_1(n)F_{k'(n)}z_1^{(1)}\}$$

$$...$$

$$H\{c_1(n)F_{k'(n)}z_1^{(7)}\}$$

As a consequence, the contribution of the 'd(2n+1)' odd resource elements to the sum $$\sum_{n=0}^{63} e_k F_k,$$

is the 8 output vectors of the Hadamard32 transform using a look-up-table for each CID1/SF possibility, dependent on the $z_1$ scrambling sequence and the cyclic shift value that are used per CID1/SF.

Such a reliable property results from the fact that the z scrambling series as well as the cyclic shift of the s sequence are functions of CID1/SF as specified in the standard.

As a consequence, the second embodiment leads to a reduction of the complexity of the IFFT output bin 0 for all CID1/SF possibilities using 9 Hadamard32 transforms—1 transform for the d(2n) even resource element contribution and 8 transforms for the d(2n+1) odd resource element contribution.

To obtain IFFT output bin b, where b is a sample of the delay range between −2 . . . 2 for instance in the example above and is generally the total admissible delay range. But this is obtained by performing cyclic delay on the FFT output, i.e. exchanging $F_k$ by $F'_k$ in the formulas above, where:

$$F_{k'} = e^{j2\pi \frac{dk}{64}} F_k$$

As a consequence, the required IFFT64 outputs is obtained using (2B+1)*9 Hadamard32 transform operations, where B is the delay range and is set to 2 in the example above. For D=2 we obtain 45 Hadamard32 transforms. This is significantly lower complexity than 2*168 IFFT64 operations, because each Hadamard32 has 80 butterfly operations compared to 192 butterflies in IFFT64, and in addition the butterflies for Hadamard transform contain no multipliers, unlike IFFT. Other procedures (cyclic delay, z-sequence descrambling, c-sequence descrambling) contribute negligible complexity penalty.

So the general procedure of the second embodiment is for instance as follows:
For each of N SSS OFDM symbols
    Obtain 11 the metric, for instance CINR, for every CID1/SF using (2D+1)*9 Hadamard transforms applied as previously described on even and odd resource elements,
    Count 12 the number of times CINR(CID1/SF) exceeds a threshold for every CID1/SF possibility
Every CID1/SF for which CINR(CID1/SF) exceeded the threshold in at least M of the N (13) examined SSS symbols is declared (14) to belong to a detected cell. The cell ID can be constructed from the CID1 value and the CID2 value obtained from the PSS. The SF value can be used to obtain modulo 10 mSec timing for frame synchronization.

4. Description of a Third Embodiment

Figure 5:
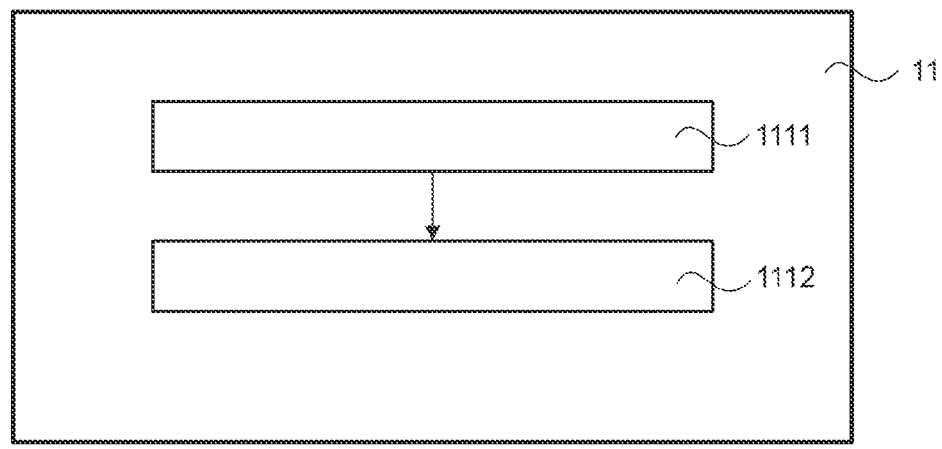
FIG. 5 illustrates the main steps of the method according to a second embodiment.

In order to lower the complexity further, the third embodiment consists of using only the even series of the SSS—the indexes corresponding to d(2n). According, to this third embodiment illustrated by FIG. 5, the step of obtaining 11 said set of metrics comprises only:
    a step of obtaining 1111 a first value depending on said 31 even resource elements,
    a step of obtaining 1112 said current metric in view of said first values.

Obviously, such a treatment further reduces the complexity since it permits to avoid using the $z_1$ scrambling sequence involved in the step of obtaining a second value depending on said 31 odd resource elements of the second embodiment.

Indeed, the unknown cyclic shift l in SF=0 is $m_0$, the shift for SF=5 is $m_1$, and for all CID values the pair $(m_0, m_1)$ is unique and $m_0 < m_1$. So by discovering these two cyclic shift values ($m_0$ and $m_1$) and noting the timings were they have been obtained, the value of CID1/SF can be inferred.

According to one variant of the third embodiment, the contribution of the 'd(2n)' even resource elements to the sum $$\sum_{n=0}^{63} e_k F_k$$

is calculated using a single Hadamard transform, using the k(n) indexes, to obtain an estimate of [32*S+2.5*I] since only half of the power is used. The linear equation for separating out S and I is performed in the same way as illustrated for the first embodiment.

Generally speaking, because half of the information is discarded, this results in performance degradation of 3 dB. This can be partially compensated for by increasing the number of examined SSS symbols.

According to this procedure, it is unknown whether an SSS appears in SF=0 or SF=5, whereas it is known that the even RE of the SSS carry $m_0$ and $m_1$ intermittently.

Such a property permits to process separately SSS arriving in 'even' and 'odd' locations (relative to some reference), then extract the cyclic shift values and construct the $(m_0, m_1)$ pairs.

The general procedure for this first variant of the third embodiment is for instance as follows:
For each of N SSS symbol appearing in even locations
    Obtain (11) CINR for every cyclic shift m using (2D+1) Hadamard transforms performed on the d(2n) RE,
    Count (12) the number of times CINR(m) exceeds a threshold,
For each of N SSS symbol appearing in odd locations
    Find CINR for every cyclic shift m using (2D+1) Hadamard transforms performed on the d(2n) RE,
    Count the number of times CINR(m) exceeds a threshold,
Every CID1/SF
    Determine the pair $(m_{odd}, m_{even})$ that should be detected from SSS in even and odd locations in case that a cell is transmitting the CID1/SF values,
    If CINR($m_{odd}$) crossed the threshold in M of the N odd symbols, and CINR($m_{even}$) crossed the threshold in M of the N even symbols, then declare the CID1/SF to have been detected and determine the cell ID and modulo 10 mSec timing accordingly.

For this first variant of the third embodiment, the complexity per processed SSS symbol consists of 2D+1 Hadamard32 operations, instead of 9*(2D+1) of the second embodiment.

According to a second variant of the third embodiment, an alternative involves inter-frequency cell scan conditions.

Inter-frequency cell scan is governed by looking at the SSS signal in observation window with periodicity which is a multiple of 10 mSec, so that all the measured SSS are from the same oddity (all are SSS symbols appearing in 'even' locations, so the option 1 algorithm cannot be used).

As a consequence, in these inter-frequency cell scan conditions, measuring only the RE carrying d(2n) would result with either $m_0$ or $m_1$ only, but not both.

The alternative variant takes benefit from this situation and detect the value $m_0$ or $m_1$ from the RE carrying d(2n) using N SSS symbols, and then use this value to descramble $z_1$ from the RE carrying d(2n+1) and proceed to decode the alternate value $m_0$ or $m_1$.

The general procedure is now as follows:

For each of N SSS symbol appearing in even locations
    Find CINR for every cyclic shift m using (2D+1) Hadamard transforms performed on the d(2n) RE
    Count the number of times CINR(m) exceeds a threshold
Determine the list of cyclic shift values m that crossed the threshold in at least M of the N symbols
For each detected cyclic shift value m
    For each of N SSS symbols appearing in even locations
        Find CINR for every cyclic shift m' using (2D+1) Hadamard transforms performed on the d(2n+1) RE after descrambling with $z_1(m)$
    For each value m' which crossed the threshold in at least M of the N symbols, determine whether the pair (m, m') corresponds to a legal value of CID1/SF. If this is the case, declare a cell with CID1/SF to have been determined and infer its parameters accordingly.

The same complexity reduction as for the first variant is obtained with this second variant of the third embodiment. Indeed a complexity per processed SSS symbol consists of 2D+1 Hadamard32 operations, instead of 9*(2D+1) of the second embodiment.

5. The Structure of a Device

Figure 6:
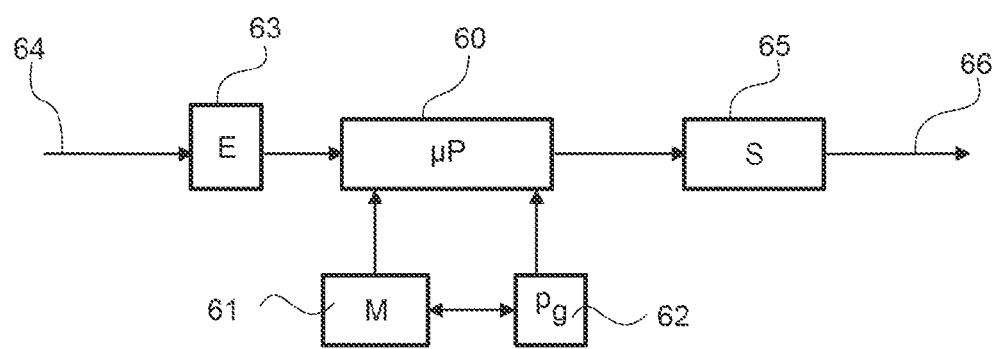
FIG. 6 illustrates a specific terminal implementing the method of an embodiment of the invention.

The structure of a device is illustrated schematically in FIG. 6. It comprises a memory M 61, and a processing unit 60 equipped with a microprocessor µP, which is driven by a computer program (or application) Pg 62. At an input, the processing unit 60 receives, through a network input interface module E 63, an OFDM signal 64 which the microprocessor µP processes, according to the instructions of the program Pg 62, to determine the cell identifier, which are transmitted through an output interface module S 65, thus providing an output signal 66.

Although the present disclosure has been described with reference to one or more examples, workers skilled in the art will recognize that changes may be made in form and detail without departing from the scope of the disclosure and/or the appended claims.

The invention claimed is:

1. A method for identifying a cell and a sub-frame by detecting a part of a secondary synchronization signal of a dedicated synchronization channel, said part of a secondary synchronization signal including a time-domain sequence of N OFDM symbols, N being a positive integer, wherein the method comprises:

for each OFDM symbol among said sequence of N OFDM symbols:

a step of obtaining a set of metrics for each OFDM symbol, each metric of said set of metrics being associated with a predetermined combination of a cell identifier and a sub-frame alignment;

for each metric of said set of metrics:

a step of counting a number of times the metric exceeds a first predetermined threshold, delivering a summed value M indicating the number, and a step of applying a M among N criterion to said summed value M, delivering a M/N ratio value; and a step of analyzing said M/N ratio values, in order to identify the cell and the sub-frame, corresponding to the cell identifier and the subframe alignment, associated to a particular ratio value among said M/N ratio values.

2. The method according to claim 1 wherein said metric corresponds to a Carrier-to-Interference Ratio based on a ratio of said secondary synchronization signal power to interference and noise power.

3. The method according to claim 1, wherein said step of obtaining a metric of said part of a secondary synchronization signal involves a fast sequence transform based on a Hadamard transform.

4. The method according to claim 3, wherein every OFDM symbol of said sequence of N OFDM symbols is associated to a frequency-domain sequence of 31 even and 31 odd resource elements, each resource element corresponding to one complex-valued modulation of said OFDM symbol and wherein said metric is a result of a calculation among at least one subset of said resource elements, and wherein said step of obtaining said set of metrics comprises, for a current metric corresponding to a current OFDM symbol and the predetermined combination comprising the cell identifier and the subframe alignment:

a step of obtaining a first value depending on said 31 even resource elements, a step of obtaining a second value depending on said 31 odd resource elements, and a step of obtaining said current metric in view of said first and second values.

5. The method according to claim 4, wherein said first value, for every cyclic shift m applied to said even resource elements, is the $m^{th}$ of the cyclic-correlation and sum operation performed using said Hadamard transform of a basic m-sequence, and wherein said step of obtaining a second value involves 8 scrambling sequences based on said Hadamard transform, applied on said 31 odd resource elements.

6. The method according to claim 3, wherein every OFDM symbol of said sequence of N OFDM symbols is associated to a frequency-domain sequence of 31 even and 31 odd resource elements, each resource element corresponding to one complex-valued modulation of said OFDM symbol and wherein said metric is a result of a calculation among at least one subset of said resource elements, and wherein said step of obtaining said set of metrics comprises, for a current metric corresponding to a current OFDM symbol and the predetermined combination comprising the cell identifier and the subframe alignment:

a step for obtaining a first value depending on said 31 even resource elements, a step of obtaining said current metric in view of said first value.

7. A device for identifying a cell and a subframe by detecting a part of a secondary synchronization signal of a dedicated synchronization channel, said part of secondary synchronization signal consisting of a time-domain sequence of OFDM symbols, wherein said device comprises:
- a processing unit; and
- a memory having program instructions stored thereon, which configure the processing unit to perform acts of:
- obtaining a set of metrics for each OFDM symbol among said sequence of N OFDM symbols, each metric of said set of metrics being associated with a predetermined combination consisting of a cell identifier and a sub-frame alignment (CID/SF),
- performing the following steps for each metric of said set of metrics:
- a step of counting a number of times the metric associated with a predetermined combination of a cell identifier and a sub-frame alignment exceeds a first predetermined threshold, delivering a summed value M indicating the number, and
- a step of applying a M among N criterion to said summed value M, delivering a M/N ratio value; and
- analyzing said M/N ratio values, in order to identify the cell and the sub-frame, corresponding to the cell identifier and the sub-frame alignment, associated to a particular ratio value among said M/N ratio values.

8. A computer program product stored on a non-transitory computer readable medium, wherein the product includes instructions of program code for implementing a method of identifying a cell and a sub-frame by detecting a part of a secondary synchronization signal of a dedicated synchronization channel, when the instructions are run on a computer, wherein said part of a secondary synchronization signal includes a time-domain sequence of N OFDM symbols, N being a positive integer, and wherein the method comprises:
- for each OFDM symbol among said sequence of N OFDM symbols:
- a step of obtaining a set of metrics for each OFDM symbol, each metric of said set of metrics being associated with a predetermined combination of a cell identifier and a sub-frame alignment;
- for each metric of said set of metrics:
- a step of counting a number of times the metric exceeds a first predetermined threshold, delivering a summed value M indicating the number, and
- a step of applying a M among N criterion to said summed value M, delivering a M/N ratio value; and
- a step of analyzing said M/N ratio values, in order to identify the cell and the sub-frame, corresponding to the cell identifier and the subframe alignment, associated to a particular ratio value among said M/N ratio values.

* * * * *